J. H. GAMBLE, F. E. PORTER & G. H. DESROCHERS.
TREAD FOR STAIRS AND OTHER PURPOSES.
APPLICATION FILED SEPT. 15, 1916.
1,263,755. Patented Apr. 23, 1918.
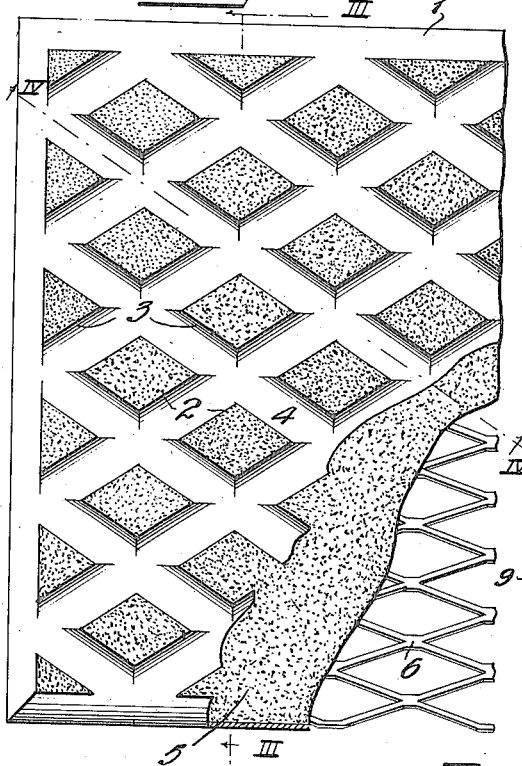
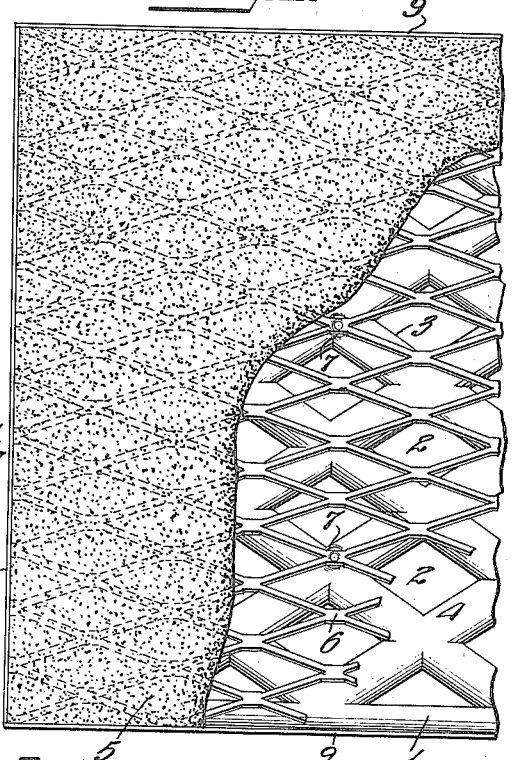
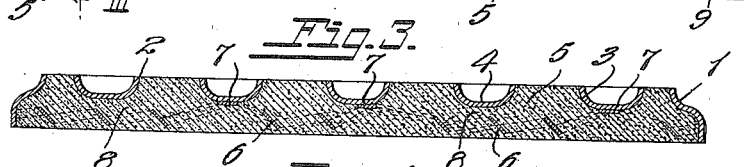
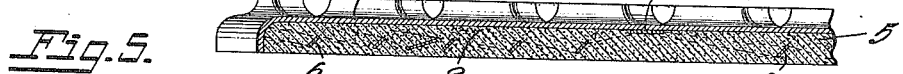
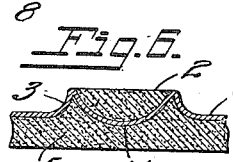
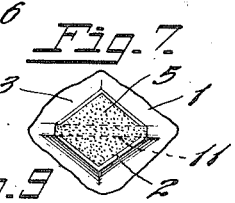
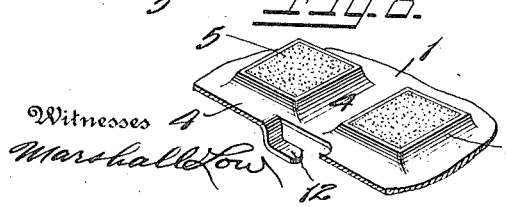
Inventor
J. H. Gamble,
F. E. Porter
and G. H. Desrochers
Witnesses
Attorney

UNITED STATES PATENT OFFICE.

JAMES HARVEY GAMBLE, FREDERICK EWING PORTER, AND GEORGE H. DESROCHERS, OF LOWELL, MASSACHUSETTS, ASSIGNORS TO AMERICAN MASON SAFETY TREAD COMPANY, OF LOWELL, MASSACHUSETTS, A CORPORATION OF MASSACHUSETTS.

TREAD FOR STAIRS AND OTHER PURPOSES.

1,263,755.

Specification of Letters Patent. Patented Apr. 23, 1918.

Application filed September 15, 1916. Serial No. 120,411.

*To all whom it may concern:*

Be it known that we, JAMES HARVEY GAMBLE, FREDERICK EWING PORTER, and GEORGE HENRY DESROCHERS, citizens of the United States, and residents of Lowell, in the county of Middlesex and State of Massachusetts, have invented certain new and useful Improvements in Treads for Stairs and other Purposes, of which the following is a specification.

The invention relates to treads for stairs and other purposes, in which a non-slipping filler is reinforced and bound securely to a metal base, frame or plate, so that the tread as a whole may be manufactured by a simple and economical process, can be handled and shipped without disintegrating and will be strong and durable in use.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Figure 1 is a plan view of a portion of a stair tread embodying the invention, partly broken away to show the sub-structure.

Fig. 2 is a bottom view of the same, partly broken away to show the super-structure.

Fig. 3 is a vertical section on line III—III of Fig. 1.

Fig. 4 is a sectional view on line IV—IV of Fig. 1.

Fig. 5 is a perspective view illustrating a modification.

Figs. 6 and 7 are respectively a vertical section and a plan view illustrating another modification.

Figs. 8 and 9 are perspective views illustrating further modifications.

Referring to the drawings, 1 indicates a plate of suitable material such as strong, stiff and sufficiently malleable sheet steel, which can be cut and bent as shown and will maintain its shape and be durable in use. This plate is perforated with openings 2 of diamond or other shape, and the metal around said openings is struck or curled up as shown at 3, so that unperforated parts or strands 4 of the plate present concave surfaces upward.

5 indicates a filler loaded with grit, such as carborundum or other material suitable for non-slipping purposes, the grit being first mixed with a suitable binder to form a paste which can be molded to and with the underside of the plate 1 as shown, and which will harden into a rigid and durable consistency.

Before the filler is applied the plate is provided with substantially integral holding elements, anchors or loops which permeate the otherwise continuous body of the filler and keep the latter from being broken up or loosened or separated from the plate, either during handling or shipment or in use.

Such holding elements or anchors preferably consist in the strands of a sheet of expanded metal or lathing 6 of relatively small gage, such sheet being of approximately the same size as the plate 1. Certain of the strands of the expanded metal are suitably attached to the plate 1. Preferably they are, at their points of juncture, spot welded at 7 to the under sides of the strands 4, so that the sheet of expanded metal is then integral with the tread plate 1. Between their points 7 of spot welding and attachment the strands of the expanded metal extend across under the plate openings 2 but at a little distance below the same. Between the expanded metal and the struck up parts 3 of the tread plate are left spaces 8 (Figs. 3 and 4), and these spaces 8, as well as the space below the expanded metal, are occupied by the continuous and integral body of the filler 5, the upper and lower portions of the same being united in one piece through the openings between the strands of the metal 6. The filler as a solid plate is thus permeated throughout by the integral holding elements.

Struck down from the plate 1 are marginal side and end flanges 9, which confine and protect the filler.

The filler 5 extends into the perforations 2 and fully to the topmost parts of the strands 4, so that the sole of the shoe will take hold on the grit when the tread is stepped on.

In Figs. 5 to 8 are illustrated holding elements or anchors which are integral with the plate 1 but are struck or bent down therefrom at intervals, so as to permeate and hold the molded body of the filler 5. As shown in Fig. 5 the holding elements are in the form of a loop 10 which is struck down from the channel portion 4 of the plate, both ends of said loop being integral with the plate. In Figs. 6 and 7 the holding element is in the form of a loop 11 which is struck down from the edges of the opening 2, both ends of such loop being integral with the edges 3 which bound the opening. In Fig. 8 the holding element is in the form of an arm 12 struck down from the channel portion 4, one end only of said arm being integral with the plate 1. All of these holding elements are formed at suitable intervals on the plate 1.

In Fig. 9 the holding elements are formed by the said expanded metal 6, but in this last construction the expanded metal is secured at intervals to the under side of the plate 1 by clips 13 which are struck out from the lower portions of the plate and are bent under the strands of the expanded metal and then upward to securely clamp the latter. In this construction the expanded metal preferably sags down a little between its securing clips 13, so as to form spaces similar to the spaces 8 in Figs. 3 and 4.

Wire mesh of suitable character may be used in place of the expanded metal.

As the top metal surface of the ordinary tread wears down it becomes more or less ragged and has a tendency to bend upward in places, so that the tread becomes dangerous to use and requires to be replaced. Our improvement counteracts this difficulty by holding down this top sheet metal surface, and the tread is much more durable, and it is safer to use because an ordinary tread that has become unsafe is not always immediately replaced.

What is claimed is:

1. A tread for stairs and the like comprising a sheet metal plate formed with intersecting depressed channel members and with openings between said channel members, a grit-loaded filler molded against the under side of said channel members and into said openings, and metallic strips secured to said channel members, passing across under said openings and embedded in the body of said filler.

2. A tread for stairs and the like comprising a thin sheet metal plate formed with intersecting depressed channel members and with openings between said channel members, a grit-loaded filler molded against the under side of said channel members and into said openings, and metallic strips secured to said channel members to reinforce and strengthen the sheet metal, and extending down into and embedded in the body of said filler to anchor the metal thereto.

Signed at Lowell, in the county of Middlesex and State of Massachusetts this 29th day of July A. D. 1916.

J. HARVEY GAMBLE.
 FREDERICK EWING PORTER.
 GEORGE H. DESROCHERS.

Witnesses:
 HARVEY E. SYMONDS,
 NILDA I. BURNHAM.